(12) United States Patent
Radulescu et al.

(10) Patent No.: US 12,452,904 B2
(45) Date of Patent: Oct. 21, 2025

(54) INTRA-USER EQUIPMENT PRIORITIZATION OF TRANSMISSIONS

(71) Applicant: QUALCOMM Incorporated, San Diego, CA (US)

(72) Inventors: Andrei Dragos Radulescu, La Jolla, CA (US); Xiaoxia Zhang, San Diego, CA (US); Jing Sun, San Diego, CA (US); Aleksandar Damnjanovic, Del Mar, CA (US); Changlong Xu, Beijing (CN); Mostafa Khoshnevisan, San Diego, CA (US); Tao Luo, San Diego, CA (US); Juan Montojo, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 588 days.

(21) Appl. No.: 17/760,237

(22) PCT Filed: Apr. 15, 2020

(86) PCT No.: PCT/CN2020/084865
§ 371 (c)(1),
(2) Date: Aug. 5, 2022

(87) PCT Pub. No.: WO2021/207964
PCT Pub. Date: Oct. 21, 2021

(65) Prior Publication Data
US 2023/0055248 A1    Feb. 23, 2023

(51) Int. Cl.
*H04W 72/12*    (2023.01)
*H04W 16/14*    (2009.01)
(Continued)

(52) U.S. Cl.
CPC ......... *H04W 72/569* (2023.01); *H04W 16/14* (2013.01); *H04W 74/0808* (2013.01)

(58) Field of Classification Search
CPC ............... H04W 72/569; H04W 72/23; H04W 72/1268; H04W 16/14; H04W 74/0808
(Continued)

(56) References Cited

U.S. PATENT DOCUMENTS

2018/0262311 A1*  9/2018  Wang ..................... H04L 5/0053
2019/0261229 A1*  8/2019  Singh .................... H04L 5/0096
(Continued)

FOREIGN PATENT DOCUMENTS

CN      107231643 A     10/2017
CN      110461044 A     11/2019
(Continued)

OTHER PUBLICATIONS

International Search Report and Written Opinion—PCT/CN2020/084865—ISA/EPO—Jan. 15, 2021.
(Continued)

*Primary Examiner* — Candal Elpenord
(74) *Attorney, Agent, or Firm* — Harrity & Harrity

(57) ABSTRACT

Various aspects of the present disclosure generally relate to wireless communication. In some aspects, a UE may receive an indication that a transmission of first data is to be modified and that second data is to be transmitted in place of a portion of the transmission of the first data; and identify a single time at which the transmission of the first data is to be canceled and transmission of the second data can begin, based at least in part on capabilities of the UE. Numerous other aspects are provided.

35 Claims, 12 Drawing Sheets

(51) Int. Cl.
*H04W 72/566* (2023.01)
*H04W 74/08* (2024.01)
*H04W 74/0808* (2024.01)

(58) Field of Classification Search
USPC .................................................. 370/329–330
See application file for complete search history.

(56) References Cited

U.S. PATENT DOCUMENTS

| | | | | |
|---|---|---|---|---|
| 2020/0229202 | A1* | 7/2020 | Bagheri | H04L 25/0226 |
| 2021/0144708 | A1* | 5/2021 | Wang | H04W 72/0453 |
| 2022/0217760 | A1* | 7/2022 | Iyer | H04L 1/1896 |
| 2023/0076058 | A1* | 3/2023 | Sheng | H04W 74/0808 |

FOREIGN PATENT DOCUMENTS

| | | |
|---|---|---|
| WO | 2019019055 A1 | 1/2019 |
| WO | 2019185008 A1 | 10/2019 |
| WO | 2019194624 A1 | 10/2019 |

OTHER PUBLICATIONS

Nokia, et al., "On Intra-UE UL Multiplexing Between eMBB and URLLC," 3GPP TSG-RAN WG1 Meeting #93, R1-1806659, May 21-25, 2018 (May 25, 2018) section 2.1, 4 pages.

Vivo: "Offline Discussion for UL Inter UE Tx Prioritization/multiplexing," 3GPP TSG RAN WG1 Meeting #94 R1-1809866, Aug. 20-24, 2018 (Aug. 24, 2018) section 3.1, 5 pages.

Ericsson: "On Intra-UE Prioritization Enablers", 3GPP TSG RAN WG1 Meeting #96 bis, Tdoc R1-1904130, Xian, China, Apr. 8, 2019-Apr. 12, 2019, Apr. 3, 2019, pp. 1-10.

Intel Corporation: "Remaining details on UCI enhancements for URLLC", 3GPP TSG-RAN WG1 #100, R1-2000736, e-Meeting, Feb. 24, 2020-Mar. 6, 2020, pp. 1-9, Feb. 15, 2020.

Qualcomm: "Remaining Issues on UCI Enhancements for URLLC", 3GPP TSG RAN WG1 #100 eMeeting, R1-2000969, e Meeting, Feb. 24, 2020-Mar. 6, 2020, Feb. 15, 2020, 9 Pages.

Ericsson: "On Intra-UE Prioritization Enablers", 3GPP Draft, R1-1904130, 3GPP TSG RAN WG1 Meeting #96 bis, On Intra-UE Prioritization Enablers, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 3, 2019 (Apr. 3, 2019), XP051707131, 10 Pages, Section 2.4, p. 8, paragraph [02.3], figure 5.

Intel Corporation: "Remaining details on UCI enhancements for URLLC", 3GPP TSG- RAN WG1 #100, R1-2000736, 3rd Generation Partnership Project, Mobile Competence Centre, 650, Route Des Lucioles, F-06921 Sophia-Antipolis Cedex France vol. RAN WG1, No. e-Meeting, Feb. 24, 2020-Mar. 6, 2020, Feb. 15, 2020, XP051853429, Mar. 6-24, 2020, pp. 1-9, Paragraph [0006].

Qualcomm: "Remaining Issues on UCI Enhancements for URLLC", 3GPP TSG RAN WG1 #100 eMeeting, R1-2000969, 3rd Generation Partnership Project, Mobile Competence Centre, 650, Route Des Lucioles, F-06921 Sophia-Antipolis Cedex, France vol. RAN WG1, No. e Meeting, Feb. 24, 2020-Mar. 6, 2020 Feb. 15, XP052344030, pp. 1-9, paragraph [0002]-paragraph [0003].

Supplementary European Search Report—EP20930785—Search Authority—The Hague—Nov. 21, 2023.

* cited by examiner

INTRA-USER EQUIPMENT PRIORITIZATION OF TRANSMISSIONS

CROSS-REFERENCE TO RELATED APPLICATION

This application is a 371 national stage of Patent Cooperation Treaty (PCT) Application No. PCT/CN2020/084865 filed on Apr. 15, 2020, entitled "INTRA-USER EQUIPMENT PRIORITIZATION OF TRANSMISSIONS," which is hereby expressly incorporated by reference herein.

FIELD OF THE DISCLOSURE

Aspects of the present disclosure generally relate to wireless communication and to techniques and apparatuses for intra-user equipment prioritization of transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include receiving an indication that a transmission of first data is to be modified and that second data is to be transmitted in place of a portion of the transmission of the first data; and identifying a single time at which the transmission of the first data is to be canceled and transmission of the second data can begin, based at least in part on capabilities of the UE.

In some aspects, a method of wireless communication, performed by a UE, may include receiving an indication that a transmission of first data is to be modified and that second data is to be transmitted in place of a portion of the transmission of the first data; and communicating via one or more of uplink transmissions or downlink transmissions between a first time at which the UE is capable of canceling the transmission of the first data and a second time at which the UE begins transmission of the second data.

In some aspects, a method of wireless communication, performed by a wireless communication device, may include transmitting an indication that a transmission of first data for a UE is to be modified and that second data is to be transmitted in place of a portion of the transmission of the first data; and identifying a single time at which the transmission of the first data is to be canceled and transmission of the second data can begin, based at least in part on capabilities of the UE.

In some aspects, a method of wireless communication, performed by a wireless communication device, may include transmitting an indication that a transmission of first data for a UE is to be modified and that second data is to be transmitted in place of a portion of the transmission of the first data; and communicating one or more of uplink transmissions, downlink transmissions, or some combination thereof between a first time at which the UE is capable of canceling the transmission of the first data and a second time at which the UE begins transmission of the second data.

In some aspects, a user equipment for wireless communication may include a memory and one or more processors operatively coupled to the memory. The memory and the one or more processors may be configured to receive an indication that a transmission of first data is to be modified and that second data is to be transmitted in place of a portion of the transmission of the first data; and identify a single time at which the transmission of the first data is to be canceled and transmission of the second data can begin, based at least in part on capabilities of the UE.

In some aspects, a user equipment for wireless communication may include a memory and one or more processors operatively coupled to the memory. The memory and the one or more processors may be configured to receive an indication that a transmission of first data is to be modified and that second data is to be transmitted in place of a portion of the transmission of the first data; and communicate via one or more of uplink transmissions or downlink transmissions between a first time at which the UE is capable of canceling the transmission of the first data and a second time at which the UE begins transmission of the second data.

In some aspects, a wireless communication device for wireless communication may include a memory and one or more processors operatively coupled to the memory. The memory and the one or more processors may be configured to transmit an indication that a transmission of first data for a UE is to be modified and that second data is to be transmitted in place of a portion of the transmission of the first data; and identify a single time at which the transmission of the first data is to be canceled and transmission of the second data can begin, based at least in part on capabilities of the UE.

In some aspects, a wireless communication device for wireless communication may include a memory and one or more processors operatively coupled to the memory. The memory and the one or more processors may be configured to transmit an indication that a transmission of first data for a UE is to be modified and that second data is to be transmitted in place of a portion of the transmission of the first data; and communicate one or more of uplink transmissions, downlink transmissions, or some combination thereof between a first time at which the UE is capable of canceling the transmission of the first data and a second time at which the UE begins transmission of the second data.

In some aspects, a non-transitory computer-readable medium may store one or more instructions for wireless communication. The one or more instructions, when executed by one or more processors of a UE, may cause the one or more processors to receive an indication that a transmission of first data is to be modified and that second data is to be transmitted in place of a portion of the transmission of the first data; and identify a single time at which the transmission of the first data is to be canceled and transmission of the second data can begin, based at least in part on capabilities of the UE.

In some aspects, a non-transitory computer-readable medium may store one or more instructions for wireless communication. The one or more instructions, when executed by one or more processors of a UE, may cause the one or more processors to receive an indication that a transmission of first data is to be modified and that second data is to be transmitted in place of a portion of the transmission of the first data; and communicate via one or more of uplink transmissions or downlink transmissions between a first time at which the UE is capable of canceling the transmission of the first data and a second time at which the UE begins transmission of the second data.

In some aspects, a non-transitory computer-readable medium may store one or more instructions for wireless communication. The one or more instructions, when executed by one or more processors of a wireless communication device, may cause the one or more processors to transmit an indication that a transmission of first data for a UE is to be modified and that second data is to be transmitted in place of a portion of the transmission of the first data; and identify a single time at which the transmission of the first data is to be canceled and transmission of the second data can begin, based at least in part on capabilities of the UE.

In some aspects, a non-transitory computer-readable medium may store one or more instructions for wireless communication. The one or more instructions, when executed by one or more processors of a wireless communication device, may cause the one or more processors to transmit an indication that a transmission of first data for a UE is to be modified and that second data is to be transmitted in place of a portion of the transmission of the first data; and communicate one or more of uplink transmissions, downlink transmissions, or some combination thereof between a first time at which the UE is capable of canceling the transmission of the first data and a second time at which the UE begins transmission of the second data.

In some aspects, an apparatus for wireless communication may include means for receiving an indication that a transmission of first data is to be modified and that second data is to be transmitted in place of a portion of the transmission of the first data; and means for identifying a single time at which the transmission of the first data is to be canceled and transmission of the second data can begin, based at least in part on capabilities of the apparatus.

In some aspects, an apparatus for wireless communication may include means for receiving an indication that a transmission of first data is to be modified and that second data is to be transmitted in place of a portion of the transmission of the first data; and means for communicating via one or more of uplink transmissions or downlink transmissions between a first time at which the apparatus is capable of canceling the transmission of the first data and a second time at which the apparatus begins transmission of the second data.

In some aspects, an apparatus for wireless communication may include means for transmitting an indication that a transmission of first data for a UE is to be modified and that second data is to be transmitted in place of a portion of the transmission of the first data; and means for identifying a single time at which the transmission of the first data is to be canceled and transmission of the second data can begin, based at least in part on capabilities of the UE.

In some aspects, an apparatus for wireless communication may include means for transmitting an indication that a transmission of first data for a UE is to be modified and that second data is to be transmitted in place of a portion of the transmission of the first data; and means for communicating one or more of uplink transmissions, downlink transmissions, or some combination thereof between a first time at which the UE is capable of canceling the transmission of the first data and a second time at which the UE begins transmission of the second data.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
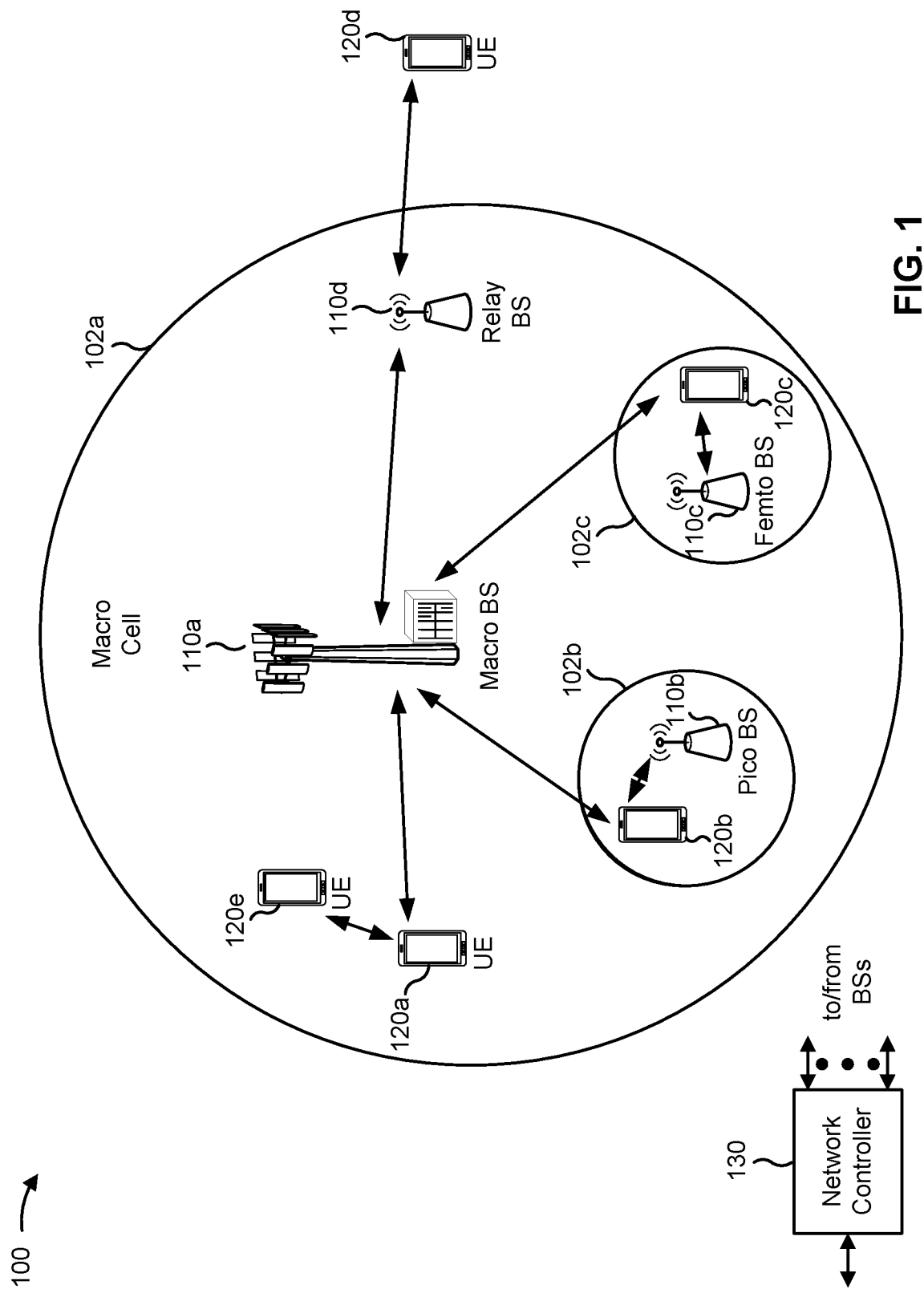
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
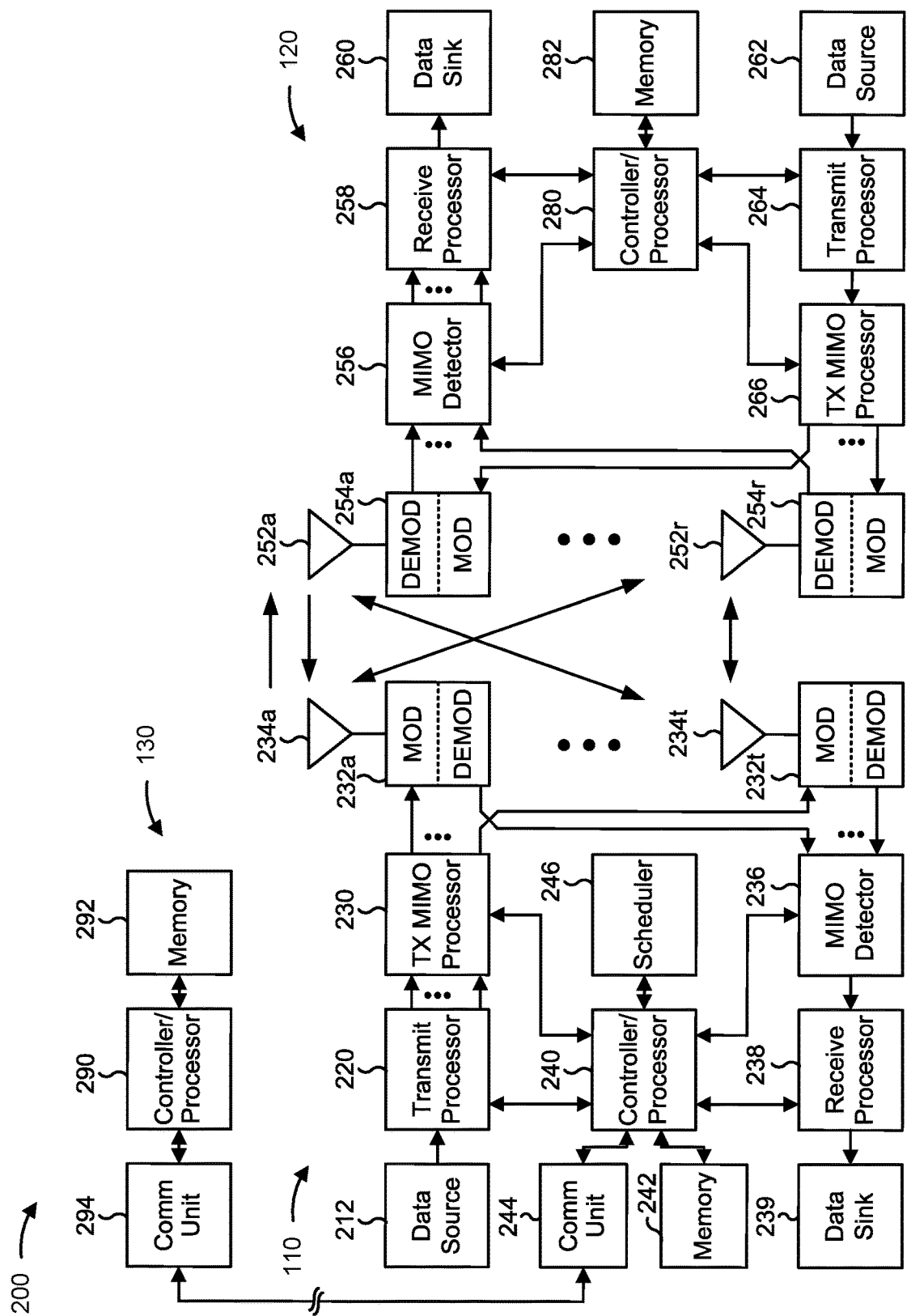
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with intra-UE prioritization of transmissions on an unlicensed band, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 100 of FIG. 9, process 1000 of FIG. 10, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example process 900 of FIG. 9, process 1000 of FIG. 10, process 100 of FIG. 9, process 1000 of FIG. 10, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for receiving an indication that transmission of first data is to be modified and that second data is to be transmitted in place of a portion of the transmission of the first data; means for identifying a single time at which the transmission of the first data is to be canceled and transmission of the second data can begin, based at least in part on capabilities of the UE, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for receiving an indication that a transmission of first data is to be modified and that second data is to be transmitted in place of a portion of the transmission of the first data; means for communicating via one or more of uplink transmissions or downlink transmissions between a first time at which the UE is capable of canceling the transmission of the first data and a second time at which the UE begins transmission of the second data; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting an indication that a portion of a scheduled transmission of first data for a UE is to be canceled and that second data is to be transmitted in place of the portion of the transmission of the first data of the first data; means for identifying a time at which the transmission of the first data is to be canceled and transmission of the second data can begin, based at least in part on capabilities of the UE and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, base station 110 may include means for transmitting an indication that a portion of a scheduled transmission of first data for a UE is to be canceled and that second data is to be transmitted in place of the portion of the transmission of the first data of the first data; means for communicating one or more of uplink transmissions, downlink transmissions, or some combination thereof between a first time at which the UE is capable of canceling the transmission of the first data and a second time at which the UE begins transmission of the second data; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
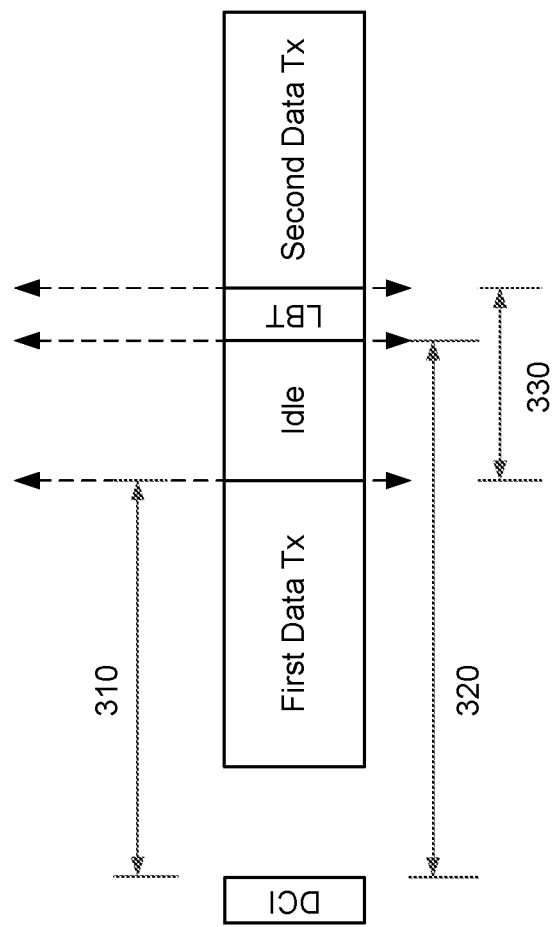
FIG. 3 is a diagram illustrating an example of uplink transmissions (e.g., in an unlicensed band or a shared band), in accordance with various aspects of the present disclosure.

FIG. 3 is a diagram illustrating an example 300 of uplink transmissions (e.g., in an unlicensed band or a shared band), in accordance with various aspects of the present disclosure. As shown in FIG. 3, a UE may receive a downlink control information (DCI) message (e.g., from a base station) that indicates that the UE is to cancel a first data transmission that is ongoing and that the UE is to begin a second data transmission.

As shown by reference number 310, the UE may determine an amount of time to cancel the first data transmission. The UE may cancel the first data transmission at or before the amount of time to cancel the first data transmission expires. The amount of time to cancel the first data transmission may be based at least in part on UE processing time for the carrier, a time to process the DCI message, capabilities of the UE (e.g., based at least in part on components of UE) to cease the first data transmission, and/or the like.

As shown by reference number 320, the UE may determine an amount of time before the UE is able to begin the second data transmission. The amount of time before the UE is able to begin the second data transmission may based at least in part on UE processing time for the carrier, a time to process the DCI message, capabilities of the UE, and/or the like.

As shown by reference number 330, a gap may exist between ceasing the first data transmission and beginning the second data transmission. In some protocols, the UE may need to perform channel sensing before beginning the second data transmission. Based at least in part on the gap, the UE may be idle for a portion of the gap and may perform a listen before talk (LBT) process to determine if the UE can access resources for the second data transmission.

If another UE or other device begins a transmission before the UE completes the LBT process, the UE may not gain access to the resources for the second data transmission. In other words, the UE may cease the first data transmission (e.g., a low priority transmission) based at least in part on an indication to replace a port of the transmission of the first data with a second data transmission (e.g., a high priority transmission), and may then be unable to transmit either the first data transmission or the second data transmission. This may result in a failure to perform the second data transmission within a latency requirement, which may cause one or more additional errors or failures in communications associated with the UE. The UE and/or an associated base station may use computing, communication, and/or network resources to detect and/or recover from the one or more additional errors or failures in the communications associated with the UE.

In some aspects described herein, a UE may receive an indication that a portion of a scheduled transmission of first data is to be canceled and that second data is to be transmitted in place of the portion of the transmission of the first data of the first data. The UE may perform one or more actions to improve a likelihood of maintaining or re-accessing a channel used for the transmission of the first data so that the UE can transmit the second data. For example, the UE may In some aspects, the UE may identify a time at which the transmission of the first data is to be canceled and transmission of the second data can begin. The UE may identify the time based at least in part on capabilities of the UE. In some aspects, by identifying a single time at which the transmission of the first data is to be canceled and transmission of the second data can begin, the UE may perform one or more actions to reduce and/or eliminate a gap between the cancelation of the transmission of the first data and beginning the transmission of the second data. For example, the UE may communicate during By eliminating the gap, the UE may avoid performing an LBT process, may maintain access to the channel, and may transmit the second data at a transmission opportunity without waiting for the channel to become available. Alternatively, the UE may avail itself of the chance to perform a more advantageous LBT process (e.g. shorter listening requirement, cat-2 LBT—aka Type-1 LBT). This may conserve computing, communication, and/or network resources that may otherwise be used to detect and/or recover from one or more errors or failures in communications associated with the UE.

Figure 4:
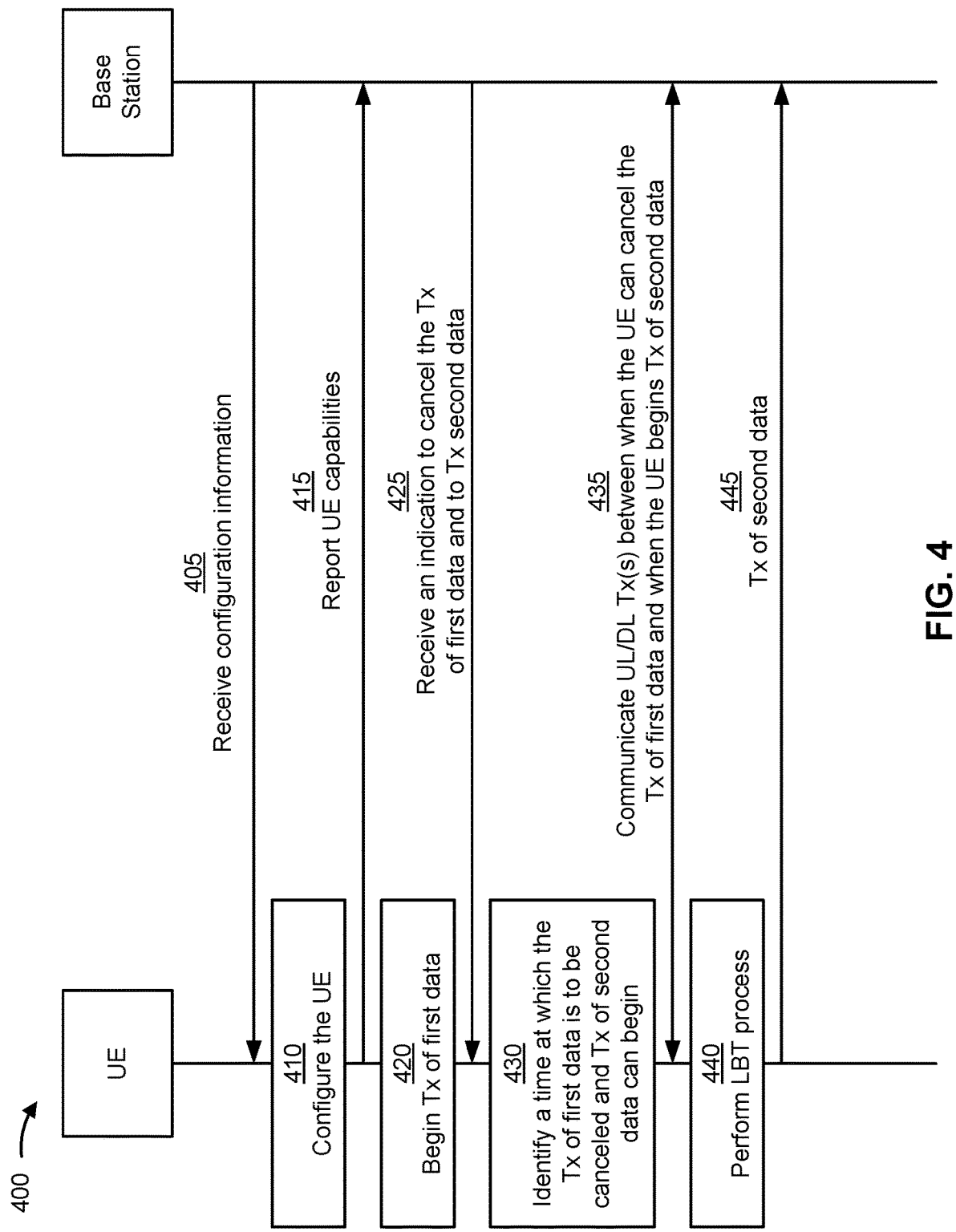
FIG. 4 is a diagram illustrating an example of uplink transmissions (e.g., in an unlicensed band or a shared band), in accordance with various aspects of the present disclosure.

FIG. 4 is a diagram illustrating an example 400 of uplink transmissions (e.g., in an unlicensed band or a shared band), in accordance with various aspects of the present disclosure. As shown in FIG. 4, a UE (e.g., UE 120) may communicate with a base station (e.g., base station 110). In some aspects, the UE and the base station may be part of a wireless network (e.g., wireless network 100). In some aspects, the UE and the base station may communicate via an unlicensed band or a shared band (e.g., a spectrum with licensed users and unlicensed users) and/or based at least in part on a protocol that requires channel sensing (e.g., an LBT process) before beginning a transmission. Although FIG. 4 describes communications between the UE and a base station, the UE may instead communicate with another wireless communication device (e.g., another UE, another base station, a remote radio head, and/or the like) in a similar manner.

As shown by reference number 405, the UE may receive configuration information (e.g., from the base station, another base station, and/or the like). In some aspects, the UE may receive the configuration information via one or more of radio resource control (RRC) signaling, medium access control control elements (MAC CEs), and/or the like. In some aspects, the configuration information may indicate one or more configuration parameters (e.g., already known to the UE) for selection by the UE, explicit configuration information for the UE to use to configure the UE, and/or the like.

As shown by reference number 410, the UE may configure the UE for communicating with the base station. In some aspects, the UE may configure the UE based at least in part on the configuration information. In some aspects, the UE may configure a response to receiving an indication to replace an ongoing transmission with another transmission (e.g., when using an unlicensed band). In some aspects, the UE may be configured to perform one or more operations described herein.

As shown by reference number 415, the UE may report UE capabilities to the base station. For example, the UE may indicate processor resources, communication resources, and/or the like. In some aspects, the UE capabilities may include a capability for canceling a transmission (e.g., an amount of time expected to cease the transmission), a capability for initiating a new transmission (e.g., an amount of time expected to begin the new transmission), a capability to operate in unlicensed bands, and/or the like (e.g. an ability to fill a gap with a transmission or reception, between a first baseline cancellation time and a second transmission). For example, the UE may report a number of symbols for the UE to cancel the transmission, a number of symbols for the UE to initiate a new transmission, and/or the like.

As shown by reference number 420, the UE may begin transmission of first data. For example, the UE may begin the transmission of the first data based at least in part on a resource grant for transmitting the first data. The resource grant may be a dynamic resource grant, a configured grant (e.g., semi-persistent scheduling (SPS) grant), and/or the like. In some aspects, the UE may perform an LBT process before beginning the transmission of the first data.

As shown by reference number 425, the UE may receive an indication to cancel (e.g., cancel, postpone, or otherwise modify) the transmission of the first data and to transmit second data (e.g., in place of the first data). For example, the UE may receive an indication that a portion of a scheduled transmission of first data is to be canceled and that second data is to be transmitted in place of the portion of the transmission of the first data of the first data. In some aspects, the first data may have a priority that is lower than a priority of the second data.

In some aspects, the indication may include an identifier associated with a process for the UE to perform to cancel the transmission of the first data and to begin transmission of the second data. In some aspects, the identifier may identify the process from a set of processes that the UE is already configured to perform (e.g., based at least in part on the configuration information).

In some aspects, the indication may include an explicit request and/or resource allocation for uplink transmissions, downlink transmissions, or some combination thereof during a gap between a first time at which the UE is capable of canceling the transmission of the first data and a second time at which the UE begins transmission of the second data. In some aspects, the explicit request and/or resource allocation may include a request for one or more sounding reference signals (SRSs), a request for channel state information (CSI), some combination thereof, and/or the like. For example, the explicit request may schedule transmission of SRSs, CSI, and/or the like, may schedule reception of CSI reference signals (CSI-RSs), and/or the like.

In some aspects, the indication may include an implicit request and/or resource allocation for one or more of uplink transmissions or downlink transmissions during a gap between a first time at which the UE is capable of canceling the transmission of the first data and a second time at which the UE begins transmission of the second data. For example, based on one or more parameters of the indication (e.g., existence of a gap, a duration of the gap, and/or the like), the UE may be configured to determine an implied request and/or resource allocation for uplink transmissions, downlink transmissions, or some combination thereof. In some aspects, the UE may determine to communicate one or more of pilots, control information, and/or the like based at least in part on determining a gap between the first time and the second time.

In some aspects, one or more transmissions in the gap may be best effort transmissions. For example, the UE may be triggered to transmit using SRS resources prior (or just prior) to the second data transmission. The UE may transmit such best effort transmission if it has acquired the channel, otherwise it may skip the best effort transmission. In this way, the UE may acquire the channel as soon as possible, and maintain access to the channel until the second data transmission can begin.

As shown by reference number 430, the UE may identify a time at which the transmission of first data is to be canceled and transmission of second data can begin. In some aspects, the UE may identify the time based at least in part on capabilities of the UE. In some aspects, the UE may receive an indication of the time from the base station. In some aspects, the base station and/or the UE may determine the time based at least in part on a reported capability of the UE for canceling a transmission and a reported capability of the UE for initiating a transmission. In some aspects, the time may be based at least in part on a number of symbols from receipt of the indication.

As shown by reference number 435, the UE may communicate (e.g., transmit or receive) one or more uplink transmissions, downlink transmissions, or some combination thereof between a first time at which the UE is capable of canceling the transmission of the first data and a second time at which the UE begins transmission of the second data. In some aspects, the communications may include continuing to transmit the first data, transmitting and/or receiving control information, transmitting and/or receiving one or more pilots, and/or the like.

In some aspects, the UE may receive a resource grant that schedules one or more uplink transmissions, one or more downlink transmissions, and/or the like between the first time and the second time. In some aspects, the communications may include transmitting and/or receiving additional scheduled data, control information, and/or the like.

As shown by reference number 440, the UE may perform an LBT process. For example, the UE may perform the LBT process based on determining that a gap exists between the first time and the second time and/or that the UE has been idle (e.g., not transmitting or receiving) on the channel for a threshold amount of time between the first time and the second time. In some aspects, the determining is based on an indication received in the communication described relative to reference number 425. In some aspects, the base station may ensure that the gap is filled, so as to allow the UE to select among one or more LBT configurations (e.g. high priority Type1, Type 2A, 2B or 2C). For example, the base station may fill the gap with one or more scheduled downlink transmissions to another UE, one or more scheduled uplink transmissions from the other UE, and/or the like. In some aspects, the base station may indicate an LBT procedure for the UE to perform.

A shown by reference number 445, the UE may transmit the second data (e.g., to the base station). In some aspects, the UE may transmit the second data after performing the LBT process. In some aspects, the UE may transmit the second data without performing an LBT process (e.g., based at least in part on determining that a gap does not exist between the first time and the second time and/or that the UE has not been idle on the channel for the threshold amount of time between the first time and the second time).

Based at least in part on eliminating a gap between the first time and the second time, the UE may avoid performing an LBT process, may maintain access to the channel, and may transmit the second data at an earliest opportunity without waiting for the channel to become available. Alternatively, UE may avail itself of the chance to perform a more advantageous LBT process (e.g. shorter listening requirement, cat-2 LBT—aka Type-1 LBT). This may conserve computing, communication, and/or network resources that may otherwise be used to detect and/or recover from one or more errors or failures in communications associated with the UE.

As indicated above, FIG. 4 is provided as an example. Other examples may differ from what is described with respect to FIG. 4.

Figure 5:
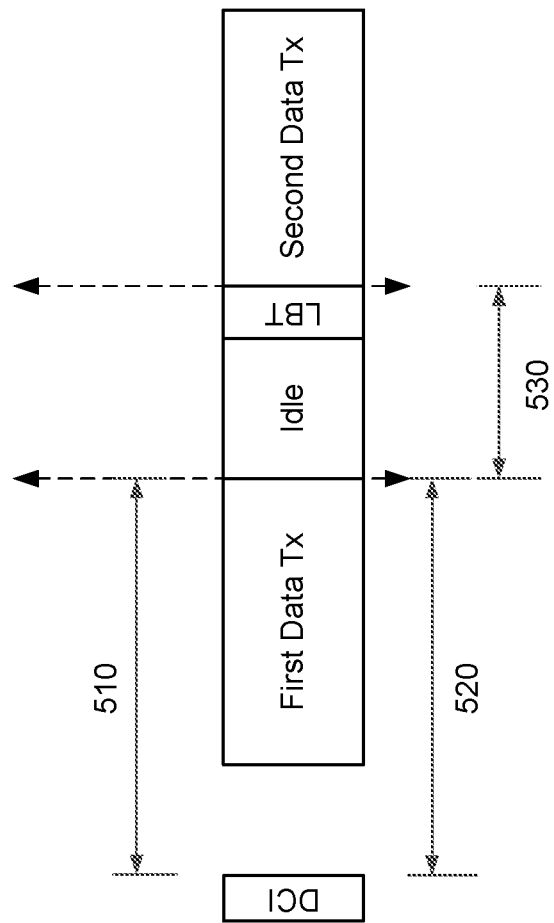
FIG. 5 is a diagram illustrating an example of uplink transmissions in an unlicensed band, in accordance with various aspects of the present disclosure.

FIG. 5 is a diagram illustrating an example 500 of uplink transmissions in an unlicensed band, in accordance with various aspects of the present disclosure. As shown in FIG. 5 a UE (e.g., UE 120) may receive a DCI message (e.g., from a base station) that indicates that the UE is to cancel transmission of an ongoing first data transmission and that the UE is to begin transmitting a second data transmission.

As shown by reference number 510, the UE may determine a time for canceling the first data transmission based at least in part on a UE processing time capability for an associated carrier and a greater of an amount of time for canceling the first data transmission (e.g., based at least in part on a capability of the UE) and an amount of time for beginning the second data transmission (e.g., based at least in part on the capability of the UE).

As shown by reference number 520, the UE may determine a time at which the UE is able to begin the second data transmission based at least in part on a UE processing time capability for an associated carrier and the greater of the amount of time for canceling the first data transmission and the amount of time for beginning the second data transmission.

In other words, the UE may determine the time for canceling the first data transmission to be the same as the time at which the UE is able to begin the second data transmission.

As shown by reference number 530, the UE may determine a time during which a prospective gap may exist between the time at which the UE cancels the first data transmission and a time at which the UE is to begin the second data transmission. The prospective gap may exist based at least in part on the UE beginning the second data transmission later than the time at which the UE is able to begin the second data transmission.

In this way, the UE may determine how to avoid idleness during the prospective gap based at least in part on the UE canceling the first data at the time at which the UE is also able to begin transmitting. As described herein, the UE may determine to communicate during the prospective gap to avoid idleness between the time at which the UE cancels the first data transmission and the time at which the UE begins the second data transmission.

As indicated above, FIG. 5 is provided as an example. Other examples may differ from what is described with respect to FIG. 5.

Figure 6:
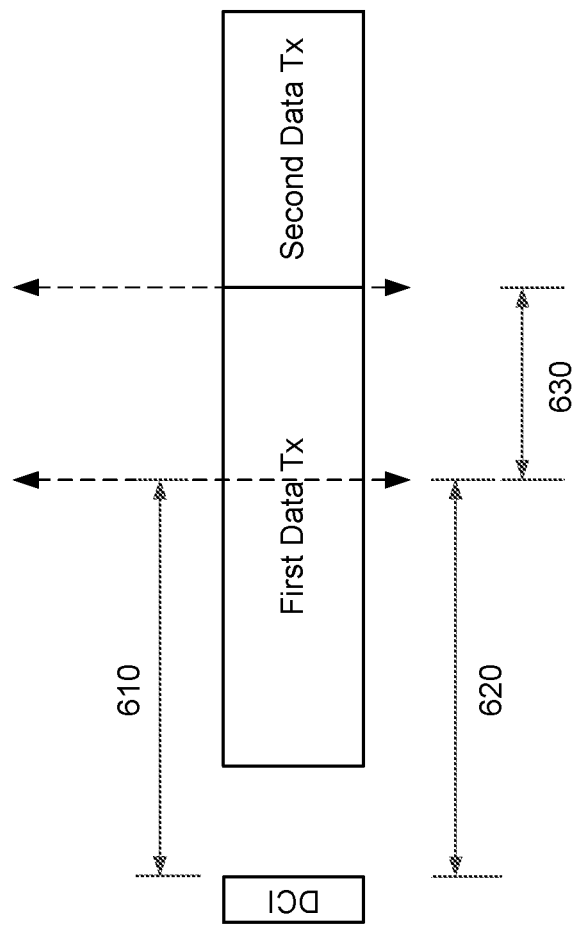
FIG. 6 is a diagram illustrating an example of uplink transmissions in an unlicensed band, in accordance with various aspects of the present disclosure.

FIG. 6 is a diagram illustrating an example 600 of uplink transmissions in an unlicensed band, in accordance with various aspects of the present disclosure. As shown in FIG. 6, a UE (e.g., UE 120) may receive a DCI message (e.g., from a base station) that indicates that the UE is to cancel transmission of an ongoing first data transmission and that the UE is to begin transmitting a second data transmission.

As shown by reference number 610, the UE may determine a time at which the UE is able to cancel the first data transmission based at least in part on a UE processing time capability for an associated carrier and a greater of an amount of time for canceling the first data transmission and an amount of time for beginning the second data transmission.

As shown by reference number 620, the UE may determine a time at which the UE is able to begin the second data transmission based at least in part on a UE processing time capability for an associated carrier and the greater of the amount of time for canceling the first data transmission and the amount of time for beginning the second data transmission.

As shown by reference number 630, the UE may determine a time during which a prospective gap may exist between the time at which the UE is able to cancel the first data transmission and a time at which the UE is to begin the second data transmission. As shown, the UE may continue the first data transmission during the prospective gap. In other words, the UE may delay cancellation of the first data transmission (e.g., until the beginning of the second data transmission). In some aspects, the UE may delay cancellation of the first data transmission until the beginning of the second data transmission based at least in part on an initial scheduling for the first data transmission substantially extending to the beginning (e.g., just before the beginning) of the second data traffic.

In this way, the UE may avoid a gap during the prospective gap based at least in part on the UE filling the gap with a continuation of the first data transmission. In this way, the UE may maintain access to an associated channel and may be able to begin the second data transmission without performing an LBT process.

As indicated above, FIG. 6 is provided as an example. Other examples may differ from what is described with respect to FIG. 6.

Figure 7:
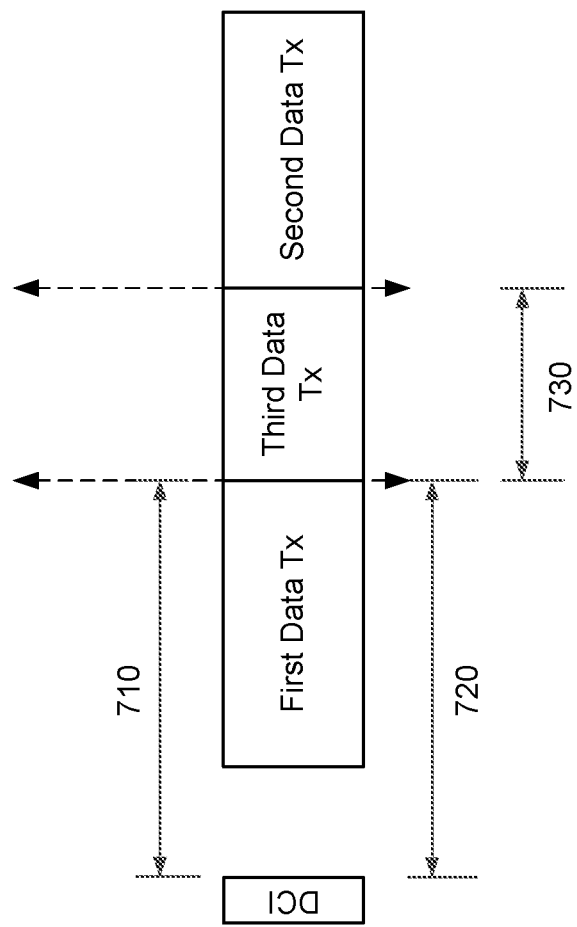
FIG. 7 is a diagram illustrating an example of uplink transmissions in an unlicensed band, in accordance with various aspects of the present disclosure.

FIG. 7 is a diagram illustrating an example 700 of uplink transmissions in an unlicensed band, in accordance with various aspects of the present disclosure. As shown in FIG. 7, a UE (e.g., UE 120) may receive a DCI message (e.g., from a base station) that indicates that the UE is to cancel transmission of an ongoing first data transmission and that the UE is to begin transmitting a second data transmission.

As shown by reference number 710, the UE may determine a time at which the UE is able to cancel the first data transmission based at least in part on a UE processing time capability for an associated carrier and a greater of an amount of time for canceling the first data transmission and an amount of time for beginning the second data transmission.

As shown by reference number 720, the UE may determine a time at which the UE is able to begin the second data transmission based at least in part on a UE processing time capability for an associated carrier and the greater of the amount of time for canceling the first data transmission and the amount of time for beginning the second data transmission. In some aspects, time references 710 and 720 may be different.

As shown by reference number 730, the UE may determine a time during which a prospective gap may exist between the time at which the UE is able to cancel the first data transmission and a time at which the UE is to begin the second data transmission. As shown, the UE and/or the base station may perform a third data transmission during the prospective gap. In some aspects, the third data transmission may be scheduled for the UE or another UE (e.g., based at least in part on a dynamic or configured resource grant). In some aspects, the DCI message may schedule the third data transmission. In some aspects, the UE or another UE may use the prospective gap to transmit data that the base station may be expecting and may be able to receive (e.g., decode). In some aspects, the base station may schedule use the prospective gap to transmit data that the UE or another UE may be expecting and may be able to receive (e.g., decode).

In this way, the UE may avoid a gap during the prospective gap based at least in part on the UE or the base station filling the gap with a scheduled third data transmission. In this way, the UE may maintain access to an associated channel and may be able to begin the second data transmission without performing an LBT process.

As indicated above, FIG. 7 is provided as an example. Other examples may differ from what is described with respect to FIG. 7.

Figure 8:
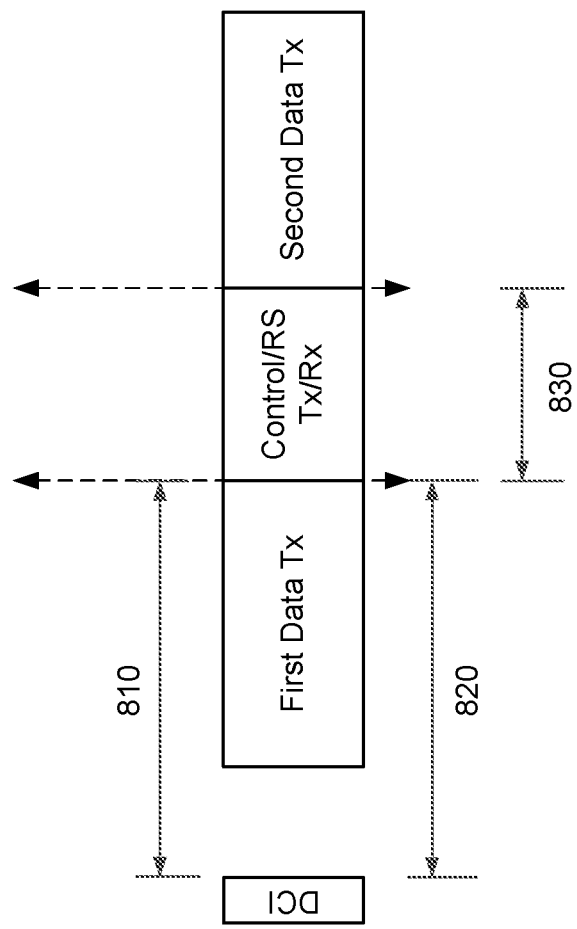
FIG. 8 is a diagram illustrating an example of uplink transmissions in an unlicensed band, in accordance with various aspects of the present disclosure.

FIG. 8 is a diagram illustrating an example 800 of uplink transmissions in an unlicensed band, in accordance with various aspects of the present disclosure. As shown in FIG. 8, a UE (e.g., UE 120) may receive a DCI message (e.g., from a base station) that indicates that the UE is to cancel transmission of an ongoing first data transmission and that the UE is to begin transmitting a second data transmission.

As shown by reference number 810, the UE may determine a time at which the UE is able to cancel the first data transmission based at least in part on a UE processing time capability for an associated carrier and a greater of an amount of time for canceling the first data transmission and an amount of time for beginning the second data transmission.

As shown by reference number 820, the UE may determine a time at which the UE is able to begin the second data transmission based at least in part on a UE processing time capability for an associated carrier and the greater of the amount of time for canceling the first data transmission and the amount of time for beginning the second data transmission. In some aspects, time references 810 and 820 may be different.

As shown by reference number 830, the UE may determine a time during which a prospective gap may exist between the time at which the UE is able to cancel the first data transmission and a time at which the UE is to begin the second data transmission. As shown, the UE may, during the prospective gap, transmit a control message (e.g., transmit a physical uplink control channel message), receive a control message (e.g., receive a physical downlink control channel message), transmit one or more reference signals and/or pilots, receive one or more reference signals and/or pilots, and/or the like. In some aspects, another UE may, during the prospective gap, transmit a control message, receive a control message, transmit one or more reference signals and/or pilots, receive one or more reference signals and/or pilots, and/or the like In some aspects, the control transmission/reception, the reference signal transmission/reception, and/or the pilots transmission/reception may be triggered explicitly or implicitly (e.g., by DCI (e.g., the DCI message)). For example, an explicit trigger may include an indicator within DCI that indicates an SRS, a CSI request, and/or the like. An implicit trigger may include a determination that a prospective gap exists between the time at which the UE is able to cancel the first data transmission and a time at which the UE is to begin the second data transmission. Based at least in part on the implicit trigger, the UE may (e.g., based at least in part on a configuration of the UE) identify one or more configurations for the control transmission/reception, the reference signal transmission/reception, and/or the pilots transmission/reception.

In this way, the UE may avoid, or limit the size of, a gap during the prospective gap based at least in part on the UE filling the gap with transmission or reception of control information, reference signals, and/or pilots. In some aspects, the transmission or reception of control information, reference signals, and/or pilots may have flexibility in duration to allow the UE to fill each symbol of the prospective gap. In this way, the UE may maintain access to an associated channel and may be able to begin the second data transmission without performing an LBT process.

As indicated above, FIG. 8 is provided as an example. Other examples may differ from what is described with respect to FIG. 8.

In some aspects, the UE performing the first transmission is not expected to receive signals during the cancelled symbols. This could happen, for instance, when the first transmission is a configured grant, which, in some cases, cannot be performed on flexible symbols. In some aspects, the base station may at least partly fill the prospective gap between the first transmission and second transmission by transmitting to the UE, another UE (e.g., an active UE, an idling UE (e.g., including RRC INACTIVE UEs), and/or the like), another base station, and/or the like.

In some aspects, UEs may be configured or implemented with the ability to perform the first transmission on at least one flexible symbols. In some other aspects, the base station can configure or assume the potentially symbols as receivable (e.g. flexible or DL-only) for some UEs, which may not include the UE involved in the first transmission. In this latter aspect, the base station can target these other UEs with downlink transmissions. In yet some other aspects, the base station transmissions may be intended for other base station, or simply to optimize medium access for the second transmission.

Figure 9:
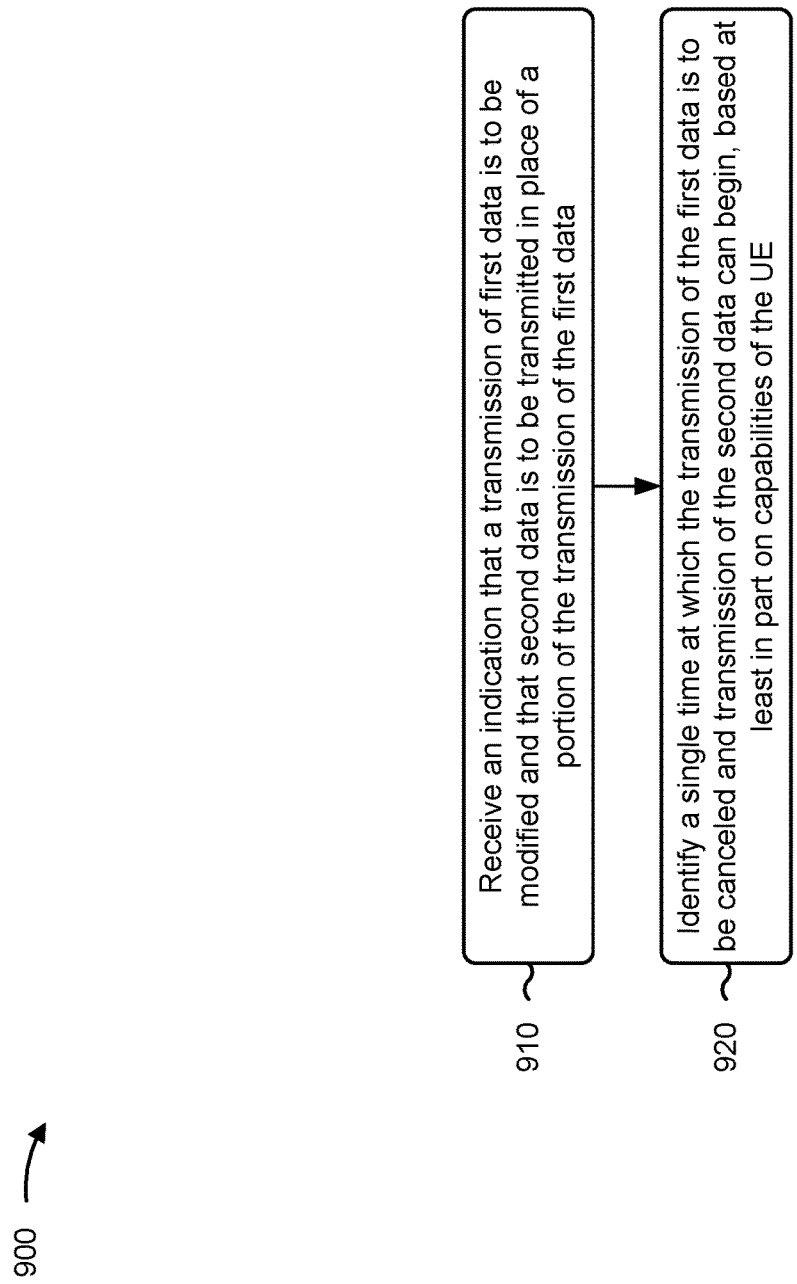
FIG. 9 is a diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where the UE (e.g., UE 120 and/or the like) performs operations associated with intra-UE prioritization of transmissions.

As shown in FIG. 9, in some aspects, process 900 may include receiving an indication that a transmission of first data is to be modified and that second data is to be transmitted in place of a portion of the transmission of the first data (block 910). For example, the UE (e.g., using receive processor 258, transmit processor 264, controller/processor 280, memory 282, and/or the like) may receive an indication that a transmission of first data is to be modified and that second data is to be transmitted in place of a portion of the transmission of the first data, as described above.

As further shown in FIG. 9, in some aspects, process 900 may include identifying a single time at which the transmission of the first data is to be canceled and transmission of the second data can begin, based at least in part on capabilities of the UE (block 920). For example, the UE (e.g., using receive processor 258, transmit processor 264, controller/processor 280, memory 282, and/or the like) may identify a single time at which the transmission of the first data is to be canceled and transmission of the second data can begin, based at least in part on capabilities of the UE, as described above.

Process 900 may include additional aspects, such as any single aspect or any combination of aspects described below and/or in connection with one or more other processes described elsewhere herein.

In a first aspect, the first data has a priority that is lower than a priority of the second data.

In a second aspect, alone or in combination with the first aspect, the transmission of the first data and the transmission of the second data are associated with transmission via an unlicensed band or a shared band.

In a third aspect, alone or in combination with one or more of the first and second aspects, process 900 includes performing a listen before talk process before the transmission of the second data.

In a fourth aspect, alone or in combination with one or more of the first through third aspects, the time at which the transmission of the first data is to cancel and transmission of the second data can begin is based at least in part on a number of symbols from a time associated with receipt of the indication.

In a fifth aspect, alone or in combination with one or more of the first through fourth aspects, the time at which the transmission of the first data is to be canceled and transmission of the second data can begin is based at least in part on a capability of the UE for canceling a transmission and a capability of the UE for initiating a transmission.

In a sixth aspect, alone or in combination with one or more of the first through fifth aspects, process 900 includes transmitting one or more transmissions before the transmission of the second data begins and after the time at which the transmission of the first data is to cancel and transmission of the second data can begin.

In a seventh aspect, alone or in combination with one or more of the first through sixth aspects, the one or more transmissions comprise one or more of: the first data, scheduled data, control information, or one or more pilots.

In an eighth aspect, alone or in combination with one or more of the first through seventh aspects, process 900 includes receiving one or more transmissions before the transmission of the second data begins and after the time at which the transmission of the first data is to cancel and transmission of the second data can begin.

In a ninth aspect, alone or in combination with one or more of the first through eighth aspects, the one or more transmissions comprise one or more of: additional scheduled data, control information, or one or more pilots.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
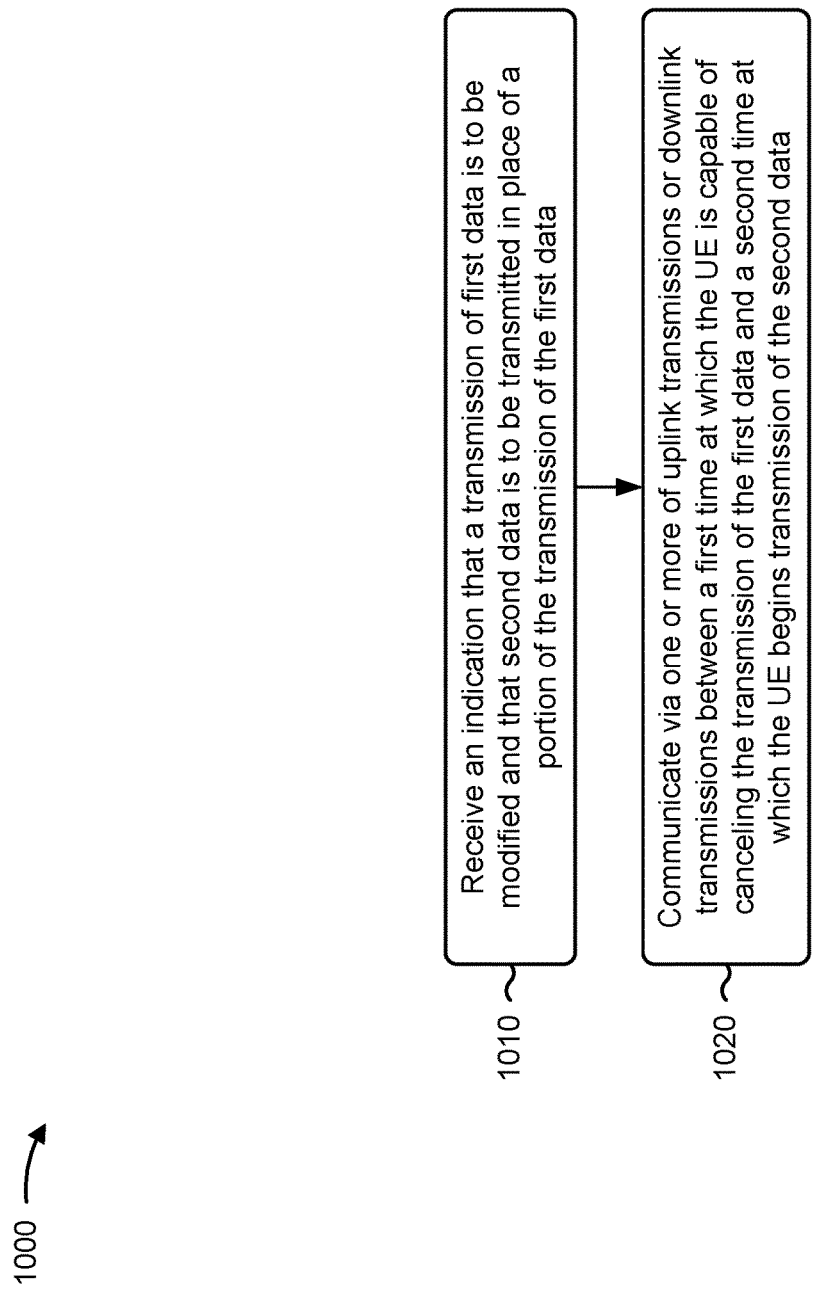
FIG. 10 is a diagram illustrating an example process performed, for example, by a user equipment, in accordance with various aspects of the present disclosure.

FIG. 10 is a diagram illustrating an example process 1000 performed, for example, by a UE, in accordance with various aspects of the present disclosure. Example process 1000 is an example where the UE (e.g., UE 120 and/or the like) performs operations associated with intra-user equipment prioritization of transmissions.

As shown in FIG. 10, in some aspects, process 1000 may include receiving an indication that a transmission of first data is to be modified and that second data is to be transmitted in place of a portion of the transmission of the first data (block 1010). For example, the UE (e.g., using receive processor 258, transmit processor 264, controller/processor 280, memory 282, and/or the like) may receive an indication that a transmission of first data is to be modified and that second data is to be transmitted in place of a portion of the transmission of the first data, as described above.

As further shown in FIG. 10, in some aspects, process 1000 may include communicating via one or more of uplink transmissions or downlink transmissions between a first time at which the UE is capable of canceling the transmission of the first data and a second time at which the UE begins transmission of the second data (block 1020). For example, the UE (e.g., using receive processor 258, transmit processor 264, controller/processor 280, memory 282, and/or the like) may communicate via one or more of uplink transmissions or downlink transmissions between a first time at which the UE is capable of canceling the transmission of the first data and a second time at which the UE begins transmission of the second data, as described above.

Process 1000 may include additional aspects, such as any single aspect or any combination of aspects described below and/or in connection with one or more other processes described elsewhere herein.

In a first aspect, the first data has a priority that is lower than a priority of the second data.

In a second aspect, alone or in combination with the first aspect, the transmission of the first data and the transmission of the second data are associated with transmission via an unlicensed band.

In a third aspect, alone or in combination with one or more of the first and second aspects, the one or more of uplink transmissions, downlink transmissions, or some combination thereof comprise: continued transmission of the first data.

In a fourth aspect, alone or in combination with one or more of the first through third aspects, process 1000 includes receiving a resource grant that schedules an uplink transmission between the first time and the second time, wherein the one or more of uplink transmissions, downlink transmissions, or some combination thereof is comprising the uplink transmission scheduled by the resource grant.

In a fifth aspect, alone or in combination with one or more of the first through fourth aspects, the one or more of uplink transmissions, downlink transmissions, or some combination thereof comprise one or more of: uplink control information, downlink control information, one or more uplink pilots, one or more downlink pilots, or some combination thereof.

In a sixth aspect, alone or in combination with one or more of the first through fifth aspects, receiving the indication comprises: receiving a downlink control information message that includes the indication and an explicit request for the one or more of uplink transmissions, downlink transmissions, or some combination thereof.

In a seventh aspect, alone or in combination with one or more of the first through sixth aspects, the explicit request comprises one or more of: a request for one or more sounding reference signals, a request for channel state information, or some combination thereof.

In an eighth aspect, alone or in combination with one or more of the first through seventh aspects, receiving the indication comprises: receiving a downlink control information message that includes the indication and an implicit request for the one or more of uplink transmissions, downlink transmissions, or some combination thereof.

In a ninth aspect, alone or in combination with one or more of the first through eighth aspects, the UE is configured to communicate one or more of pilots, control information, or some combination thereof based at least in part on determining a gap between the first time and the second time.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
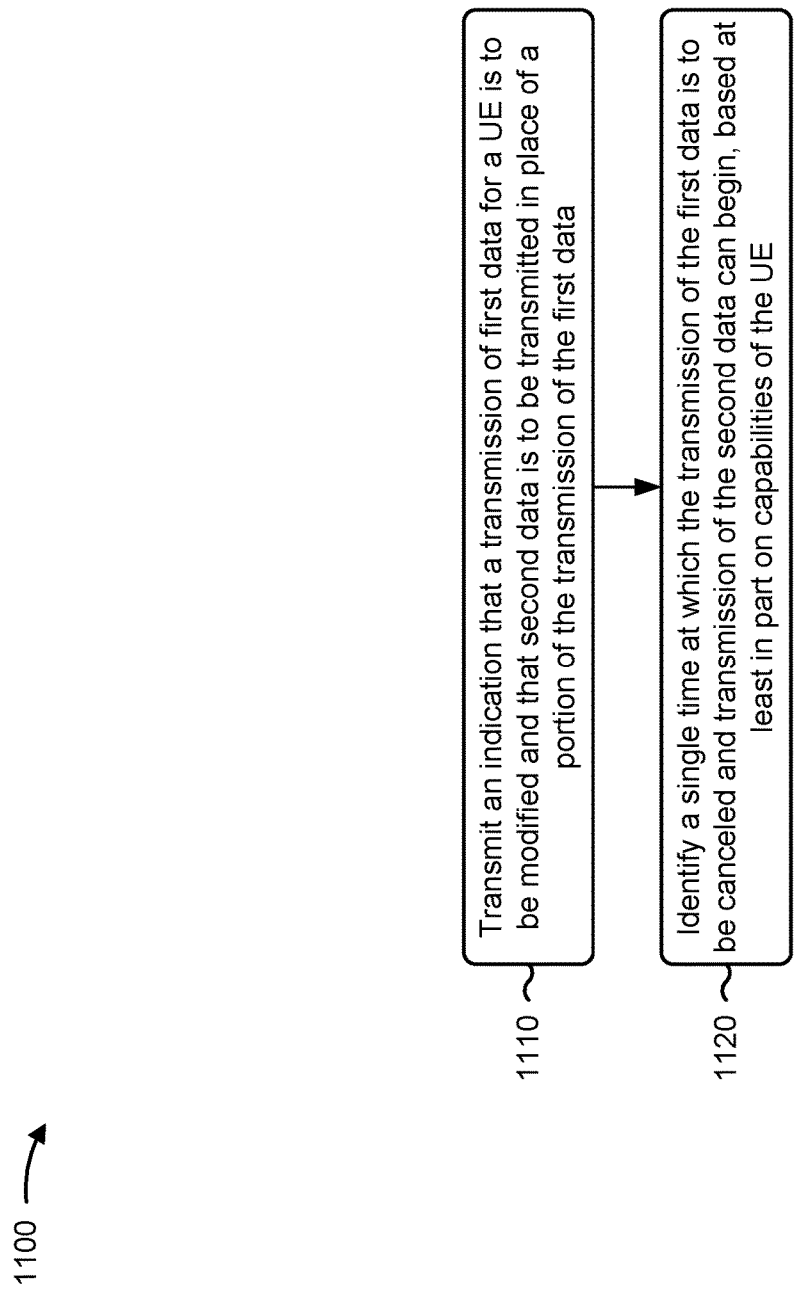
FIG. 11 is a diagram illustrating an example process performed, for example, by a base station, in accordance with various aspects of the present disclosure.

FIG. 11 is a diagram illustrating an example process 1100 performed, for example, by a base station, in accordance with various aspects of the present disclosure. Example process 1100 is an example where the base station (e.g., base station 110 and/or the like) performs operations associated with intra-UE prioritization of transmissions.

As shown in FIG. 11, in some aspects, process 1100 may include transmitting an indication that a transmission of first data for a UE is to be modified and that second data is to be transmitted in place of a portion of the transmission of the first data (block 1110). For example, the base station (e.g., using transmit processor 220, receive processor 238, controller/processor 240, memory 242, and/or the like) may transmit an indication that a transmission of first data for a UE is to be modified and that second data is to be transmitted in place of a portion of the transmission of the first data, as described above.

As further shown in FIG. 11, in some aspects, process 1100 may include identifying a single time at which the transmission of the first data is to be canceled and transmission of the second data can begin, based at least in part on capabilities of the UE (block 1120). For example, the base station (e.g., using transmit processor 220, receive processor 238, controller/processor 240, memory 242, and/or the like) may identify a single time at which the transmission of the first data is to be canceled and transmission of the second data can begin, based at least in part on capabilities of the UE, as described above.

Process 1100 may include additional aspects, such as any single aspect or any combination of aspects described below and/or in connection with one or more other processes described elsewhere herein.

In a first aspect, process 1100 includes indicating, to the UE, a type of listen before talk process to perform before the transmission of the second data begins.

In a second aspect, alone or in combination with the first aspect, process 1100 includes scheduling, during a prospective gap between the time at which the transmission of the first data is to be canceled and the transmission of the second data begins, one or more of uplink transmissions, downlink transmissions, or some combination thereof comprising one or more of: uplink transmissions by the UE, uplink transmissions by another UE, downlink transmissions to the UE, downlink transmissions to another UE, sidelink communication with the UE, sidelink communications with another UE, communications with another wireless communication device, or some combination thereof.

In a third aspect, alone or in combination with one or more of the first and second aspects, the one or more of uplink transmissions, downlink transmissions, or some combination thereof comprise one or more of: additional scheduled data, control information, one or more pilots, or some combination thereof.

In a fourth aspect, alone or in combination with one or more of the first through third aspects, process 1100 includes performing the one or more of uplink transmissions, downlink transmissions, or some combination thereof in one or more symbols that are not marked as uplink only symbols for the UE.

In a fifth aspect, alone or in combination with one or more of the first through fourth aspects, the first data has a priority that is lower than a priority of the second data.

In a sixth aspect, alone or in combination with one or more of the first through fifth aspects, the transmission of the first data and the transmission of the second data are associated with transmission via an unlicensed band or a shared band.

In a seventh aspect, alone or in combination with one or more of the first through sixth aspects, the time at which the transmission of the first data is to cancel and transmission of the second data can begin is based at least in part on a number of symbols from a time associated with transmission of the indication.

In an eighth aspect, alone or in combination with one or more of the first through seventh aspects, the time at which the transmission of the first data is to be canceled and transmission of the second data can begin is based at least in part on a reported capability of the UE for canceling a transmission and a reported capability of the UE for initiating a transmission.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
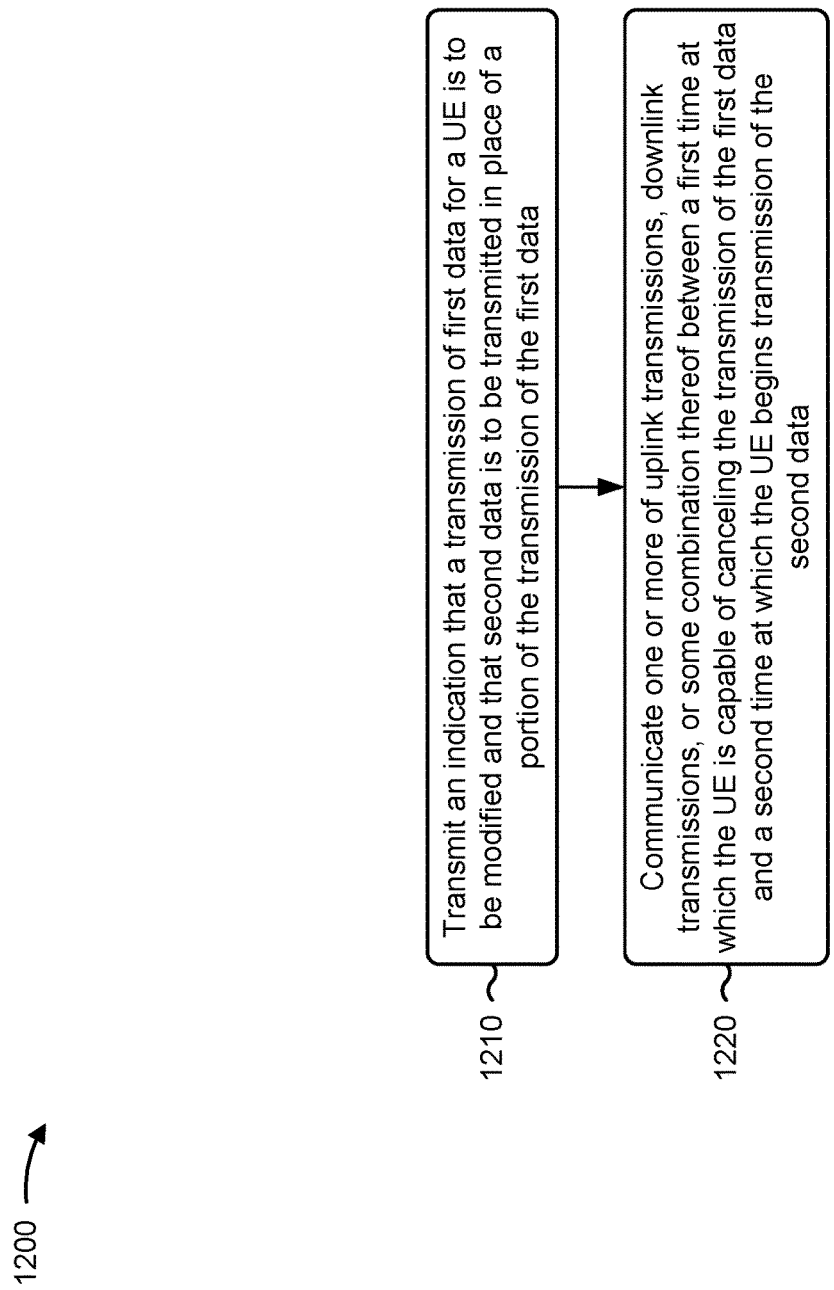
FIG. 12 is a diagram illustrating an example process performed, for example, by a base station, in accordance with various aspects of the present disclosure.

FIG. 12 is a diagram illustrating an example process 1200 performed, for example, by a base station, in accordance with various aspects of the present disclosure. Example process 1200 is an example where the base station (e.g., base station 110 and/or the like) performs operations associated with intra-UE prioritization of transmissions.

As shown in FIG. 12, in some aspects, process 1200 may include transmitting an indication that a transmission of first data for a UE is to be modified and that second data is to be transmitted in place of a portion of the transmission of the first data (block 1210). For example, the base station (e.g., using transmit processor 220, receive processor 238, controller/processor 240, memory 242, and/or the like) may transmit an indication that a transmission of first data for a UE is to be modified and that second data is to be transmitted in place of a portion of the transmission of the first data, as described above.

As further shown in FIG. 12, in some aspects, process 1200 may include communicating one or more of uplink transmissions, downlink transmissions, or some combination thereof between a first time at which the UE is capable of canceling the transmission of the first data and a second time at which the UE begins transmission of the second data (block 1220). For example, the base station (e.g., using transmit processor 220, receive processor 238, controller/processor 240, memory 242, and/or the like) may communicate one or more of uplink transmissions, downlink transmissions, or some combination thereof between a first time at which the UE is capable of canceling the transmission of the first data and a second time at which the UE begins transmission of the second data, as described above.

Process 1200 may include additional aspects, such as any single aspect or any combination of aspects described below and/or in connection with one or more other processes described elsewhere herein.

In a first aspect, process 1200 includes indicating, to the UE, a type of listen before talk process to perform before the transmission of the second data begins.

In a second aspect, alone or in combination with the first aspect, the one or more of uplink transmissions, downlink transmissions, or some combination thereof comprise one or more of: uplink transmissions by the UE, uplink transmissions by another UE, downlink transmissions to the UE, downlink transmissions to another UE, sidelink communication with the UE, sidelink communications with another UE, communications with another wireless communication device, or some combination thereof.

In a third aspect, alone or in combination with one or more of the first and second aspects, the one or more of uplink transmissions, downlink transmissions, or some combination thereof comprise one or more of: additional scheduled data, control information, one or more pilots, or some combination thereof.

In a fourth aspect, alone or in combination with one or more of the first through third aspects, process 1200 includes transmitting a resource grant that schedules an uplink transmission between the first time and the second time, wherein the one or more of uplink transmissions, downlink transmissions, or some combination thereof is comprising the uplink transmission scheduled by the resource grant.

In a fifth aspect, alone or in combination with one or more of the first through fourth aspects, the resource grant schedules an uplink transmission with the UE or another UE.

In a sixth aspect, alone or in combination with one or more of the first through fifth aspects, process 1200 includes performing the one or more of uplink transmissions, downlink transmissions, or some combination thereof in one or more symbols that are not marked as uplink only symbols for the UE.

In a seventh aspect, alone or in combination with one or more of the first through sixth aspects, the first data has a priority that is lower than a priority of the second data.

In an eighth aspect, alone or in combination with one or more of the first through seventh aspects, the transmission of the first data and the transmission of the second data are associated with transmission via an unlicensed band.

In a ninth aspect, alone or in combination with one or more of the first through eighth aspects, the one or more of uplink transmissions, downlink transmissions, or some combination thereof comprise: continued transmission of the first data.

In a tenth aspect, alone or in combination with one or more of the first through ninth aspects, transmitting the indication comprises: transmitting a downlink control information message that includes the indication and an explicit request for the one or more of uplink transmissions, downlink transmissions, or some combination thereof.

In an eleventh aspect, alone or in combination with one or more of the first through tenth aspects, the explicit request comprises one or more of: a request for one or more sounding reference signals, a request for channel state information, or some combination thereof.

In a twelfth aspect, alone or in combination with one or more of the first through eleventh aspects, transmitting the indication comprises: transmitting a downlink control information message that includes the indication and an implicit request for the one or more of uplink transmissions, downlink transmissions, or some combination thereof.

In a thirteenth aspect, alone or in combination with one or more of the first through twelfth aspects, the UE is configured to communicate one or more of pilots, control information, or some combination thereof based at least in part on determining a gap between the first time and the second time.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving an indication that a transmission of first data is to be modified and that second data is to be transmitted in place of a portion of the transmission of the first data;
   identifying a single time at which the transmission of the first data is to be canceled and transmission of the second data can begin, based at least in part on capabilities of the UE; and
   communicating, during a prospective gap between a first time at which the transmission of the first data is canceled and a second time at which the transmission of the second data is to begin, one or more of:
   uplink transmissions,
   downlink transmissions, or
   sidelink communications.

2. The method of claim 1, wherein the first data has a priority that is lower than a priority of the second data.

3. The method of claim 1, wherein the transmission of the first data and the transmission of the second data are associated with transmission via an unlicensed band or a shared band.

4. The method of claim 1, further comprising:
   performing a listen before talk process before the transmission of the second data.

5. The method of claim 1, wherein the first time and the second time are based at least in part on one or more of:
   a number of symbols from a time associated with receipt of the indication, or
   a capability of the UE for canceling a transmission and a capability of the UE for initiating a transmission.

6. The method of claim 1, wherein the one or more of the uplink transmissions, the downlink transmissions, or the sidelink communications comprise one or more of:
   the first data,
   additional scheduled data,
   control information, or
   one or more pilots.

7. A method of wireless communication performed by a user equipment (UE), comprising:
receiving an indication that a transmission of first data is to be modified and that second data is to be transmitted in place of a portion of the transmission of the first data; and
communicating via one or more of uplink transmissions or downlink transmissions during a prospective gap between a first time at which the UE is capable of canceling the transmission of the first data and a second time at which the UE begins transmission of the second data.

8. The method of claim 7, wherein the first data has a priority that is lower than a priority of the second data.

9. The method of claim 7, wherein the transmission of the first data and the transmission of the second data are associated with transmission via an unlicensed band.

10. The method of claim 7, wherein the one or more of the uplink transmissions or the downlink transmissions comprise:
continued transmission of the first data.

11. The method of claim 7, further comprising:
receiving a resource grant that schedules an uplink transmission between the first time and the second time,
wherein the uplink transmissions comprise the uplink transmission scheduled by the resource grant.

12. The method of claim 7, wherein the one or more of the uplink transmissions or the downlink transmissions comprise one or more of:
uplink control information,
downlink control information,
one or more uplink pilots, or
one or more downlink pilots.

13. The method of claim 7, wherein receiving the indication comprises:
receiving a downlink control information message that includes the indication and an explicit request for the one or more of the uplink transmissions or the downlink transmissions.

14. The method of claim 13, wherein the explicit request comprises one or more of:
a request for one or more sounding reference signals, or
a request for channel state information.

15. The method of claim 7, wherein receiving the indication comprises:
receiving a downlink control information message that includes the indication and an implicit request for the one or more of the uplink transmissions or the downlink transmissions.

16. The method of claim 15, further comprising:
communicating one or more of pilots or control information based at least in part on determining the prospective gap between the first time and the second time.

17. A method of wireless communication performed by a wireless communication device, comprising:
transmitting an indication that a transmission of first data for a user equipment (UE) is to be modified and that second data is to be transmitted in place of a portion of the transmission of the first data;
identifying a single time at which the transmission of the first data is to be canceled and transmission of the second data can begin, based at least in part on capabilities of the UE; and
scheduling, during a prospective gap between a first time at which the transmission of the first data is canceled and a second time at which the transmission of the second data is to begin, one or more of:
uplink transmissions by the UE,
uplink transmissions by another UE,
downlink transmissions to the UE,
downlink transmissions to another UE,
sidelink communications with the UE,
sidelink communications with another UE, or
communications with another wireless communication device.

18. The method of claim 17, further comprising:
indicating, to the UE, a type of listen before talk process to perform before the transmission of the second data begins.

19. The method of claim 17, wherein the one or more of the uplink transmissions by the UE, the uplink transmissions by the other UE, the downlink transmissions to the UE, the downlink transmissions to the other UE, the sidelink communications with the UE, the sidelink communications with the other UE, or the communications with the other wireless communication device comprise one or more of:
additional scheduled data,
control information, or
one or more pilots.

20. The method of claim 17, further comprising one or more of:
receiving the uplink transmissions by the UE or the uplink transmissions by the other UE in one or more symbols that are not marked as uplink only symbols for the UE,
transmitting the downlink transmissions to the UE or the downlink transmissions to the other UE in the one or more symbols, or
communicating with the other wireless communication device in the one or more symbols.

21. The method of claim 17, wherein the first data has a priority that is lower than a priority of the second data.

22. The method of claim 17, wherein the transmission of the first data and the transmission of the second data are associated with transmission via an unlicensed band or a shared band.

23. The method of claim 17, wherein the first time and the second time are based at least in part on one or more of:
a number of symbols from a time associated with transmission of the indication, or
a reported capability of the UE for canceling a transmission and a reported capability of the UE for initiating a transmission.

24. A method of wireless communication performed by a wireless communication device, comprising:
transmitting an indication that a transmission of first data for a user equipment (UE) is to be modified and that second data is to be transmitted in place of a portion of the transmission of the first data; and
communicating one or more of uplink transmissions, downlink transmissions, or communications with another wireless communication device during a prospective gap between a first time at which the UE is capable of canceling the transmission of the first data and a second time at which the UE begins transmission of the second data.

25. The method of claim 24, further comprising:
indicating, to the UE, a type of listen before talk process to perform before the transmission of the second data begins.

26. The method of claim 24, wherein the one or more of the uplink transmissions or the downlink transmissions comprise one or more of:
uplink transmissions by the UE,
uplink transmissions by another UE, downlink transmissions to the UE, or downlink transmissions to another UE.

27. The method of claim 24, wherein the one or more of the uplink transmissions, the downlink transmissions, or the communications with the other wireless communication device comprise one or more of:

additional scheduled data, control information, or one or more pilots.

28. The method of claim 24, further comprising:

transmitting a resource grant that schedules an uplink transmission between the first time and the second time, wherein the uplink transmissions comprise the uplink transmission scheduled by the resource grant.

29. The method of claim 24, further comprising:

performing the one or more of the uplink transmissions, the downlink transmissions, or the communications with the other wireless communication device in one or more symbols that are not marked as uplink only symbols for the UE.

30. The method of claim 24, wherein the one or more of the uplink transmissions, the downlink transmissions, or the communications with the other wireless communication device comprise:

continued transmission of the first data.

31. The method of claim 24, wherein transmitting the indication comprises:

transmitting a downlink control information message that includes the indication and an explicit request for the one or more of the uplink transmissions, the downlink transmissions, or the communications with the other wireless communication device.

32. The method of claim 24, wherein transmitting the indication comprises:

transmitting a downlink control information message that includes the indication and an implicit request for the one or more of the uplink transmissions, the downlink transmissions, or the communications with the other wireless communication device.

33. A user equipment (UE) for wireless communication, comprising:

a memory; and one or more processors operatively coupled to the memory, the memory and the one or more processors configured to:

receive an indication that a transmission of first data is to be modified and that second data is to be transmitted in place of a portion of the transmission of the first data;

identify a single time at which the transmission of the first data is to be canceled and transmission of the second data can begin, based at least in part on capabilities of the UE; and communicate during a prospective gap between a first time at which the transmission of the first data is canceled and a second time at which the transmission of the second data is to begin, one or more of:

uplink transmissions, downlink transmissions, or sidelink communications.

34. The UE of claim 33, wherein the one or more of the uplink transmissions, the downlink transmissions, or the sidelink communications comprise one or more of:

the first data, additional scheduled data, control information, or one or more pilots.

35. The UE of claim 33, wherein the first data has a priority that is lower than a priority of the second data.

* * * * *